(12) United States Patent
Mores et al.

(10) Patent No.: US 9,381,995 B2
(45) Date of Patent: Jul. 5, 2016

(54) ADVANCED PITCH STABILIZER

(71) Applicant: AIRBUS HELICOPTERS DEUTSCHLAND GMBH, Donauworth (DE)

(72) Inventors: Sebastian Mores, Munich (DE); Alessandro D'Alascio, Haar (DE); Uwe Kiesewetter, Rain A. Lech (DE); Stefan Probst, Buchdorf (DE); Christian Wehle, Augsburg (DE); Marius Bebesel, Augsburg (DE)

(73) Assignee: Airbus Helicopters Deutschland GMBH, Donauworth (DE)

( * ) Notice: Subject to any disclaimer, the term of this patent is extended or adjusted under 35 U.S.C. 154(b) by 90 days.

(21) Appl. No.: 14/554,142

(22) Filed: Nov. 26, 2014

(65) Prior Publication Data
US 2015/0307182 A1  Oct. 29, 2015

(30) Foreign Application Priority Data
Nov. 29, 2013 (EP) .................................. 13400035

(51) Int. Cl.
*B64C 11/00* (2006.01)
*B64C 5/10* (2006.01)
*B64C 27/82* (2006.01)
*B64C 9/06* (2006.01)

(52) U.S. Cl.
CPC ... *B64C 5/10* (2013.01); *B64C 9/06* (2013.01); *B64C 27/82* (2013.01); *B64C 2027/8254* (2013.01); *B64C 2027/8272* (2013.01); *B64C 2027/8281* (2013.01)

(58) Field of Classification Search
CPC .............................. B64D 11/00; B64C 39/024
USPC .................................. 244/17.11, 17.13, 34 A
See application file for complete search history.

(56) References Cited

U.S. PATENT DOCUMENTS

| | | | |
|---|---|---|---|
| 2,369,652 A | 2/1945 | Avery | |
| 3,583,659 A | 6/1971 | Lermusiaux | |
| 3,706,432 A | 12/1972 | Accashian | |
| 3,834,654 A * | 9/1974 | Miranda | B64C 39/068 244/13 |
| 3,902,688 A | 9/1975 | Seibel et al. | |
| 4,726,547 A | 2/1988 | Zimmer | |
| 5,503,352 A * | 4/1996 | Eger | B64C 39/12 244/13 |
| 6,659,396 B1 * | 12/2003 | August | B64C 3/16 244/45 R |
| 6,749,153 B1 * | 6/2004 | August | B64C 39/024 244/25 |

(Continued)

FOREIGN PATENT DOCUMENTS

| | | |
|---|---|---|
| EP | 0229896 | 7/1987 |
| EP | 2409917 | 1/2012 |

(Continued)

OTHER PUBLICATIONS

Extended European Search Report for EP 13400035.5, Completed by the European Patent Office, Dated Apr. 23, 2014, 7 Pages.

*Primary Examiner* — Brian M O'Hara
*Assistant Examiner* — Keith L Dixon
(74) *Attorney, Agent, or Firm* — Brooks Kushman P.C.

(57) ABSTRACT

A pitch stabilizer with box configuration suitable for providing stability to a rotorcraft comprising a vertical mid-plane and a fuselage; the pitch stabilizer comprising one or two pitch stabilizing assemblies, with no more than one pitch stabilizing assembly on each side of the vertical mid-plane, wherein each pitch stabilizing assembly comprises upper pitch stabilizing means, lower pitch stabilizing means and a wing tip element.

11 Claims, 9 Drawing Sheets

(56) References Cited

U.S. PATENT DOCUMENTS

| | | | | |
|---|---|---|---|---|
| 7,410,122 B2* | 8/2008 | Robbins | ............... | B64C 39/068 244/12.3 |
| 8,220,737 B2* | 7/2012 | Wood | ................ | B64C 29/0025 244/12.3 |
| 8,439,310 B2* | 5/2013 | Cazals | ................. | B64C 39/068 244/135 R |
| 8,573,530 B2* | 11/2013 | Cazals | .................... | B64C 5/02 244/34 A |
| 2012/0018570 A1 | 1/2012 | Borie et al. | | |

FOREIGN PATENT DOCUMENTS

| | | |
|---|---|---|
| GB | 606420 | 8/1948 |
| NL | 16887 | 7/1927 |

* cited by examiner

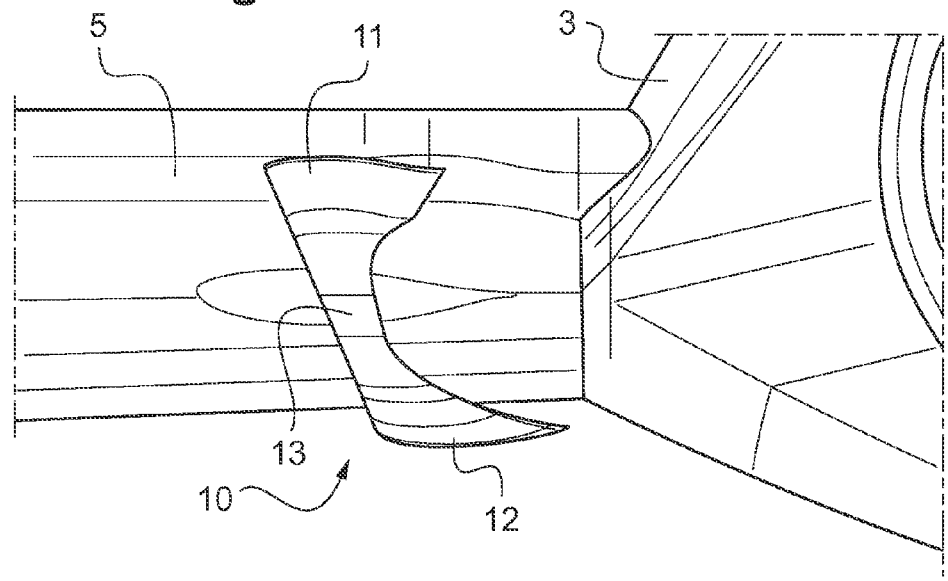
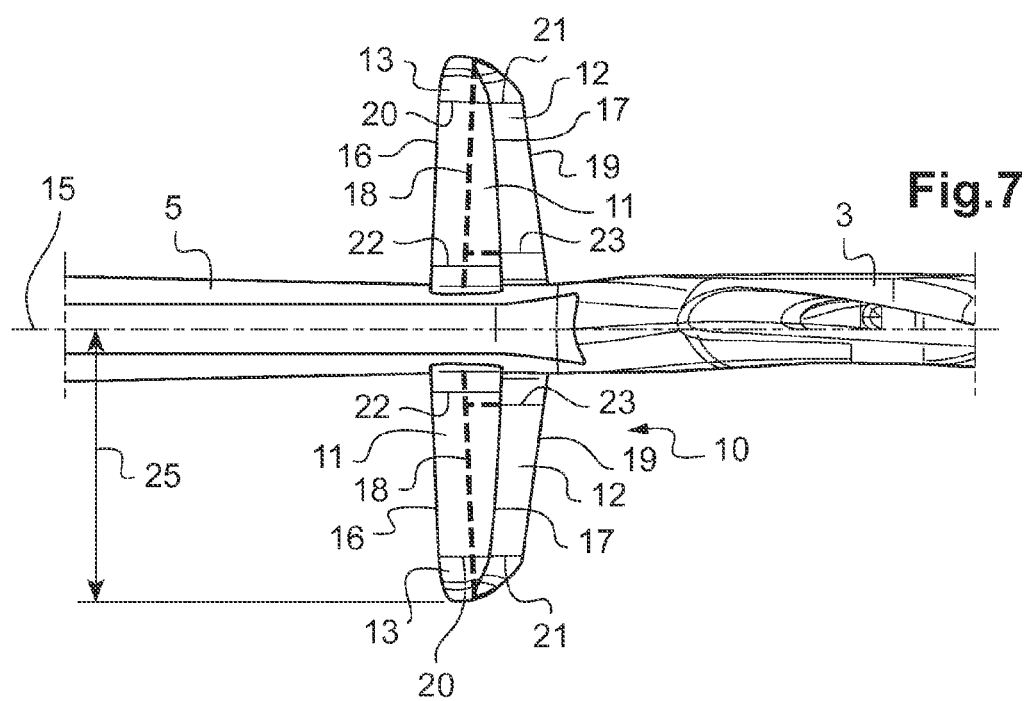

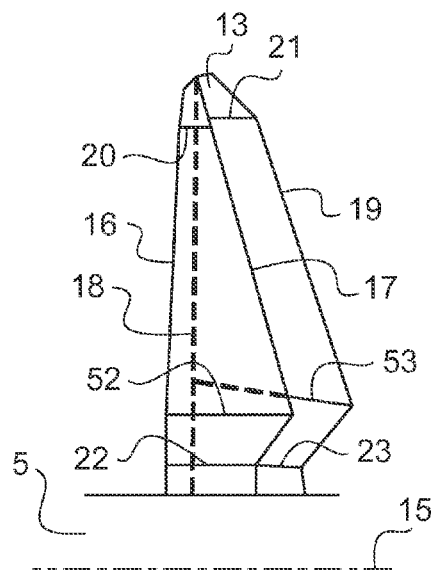
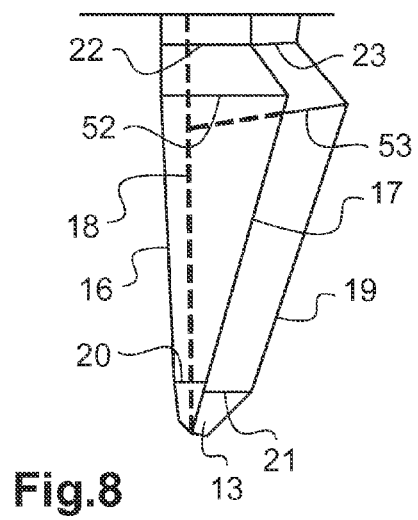
Fig.8
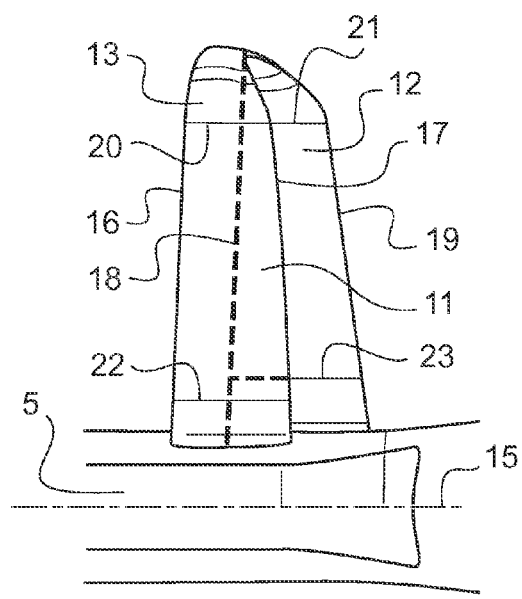
Fig.9
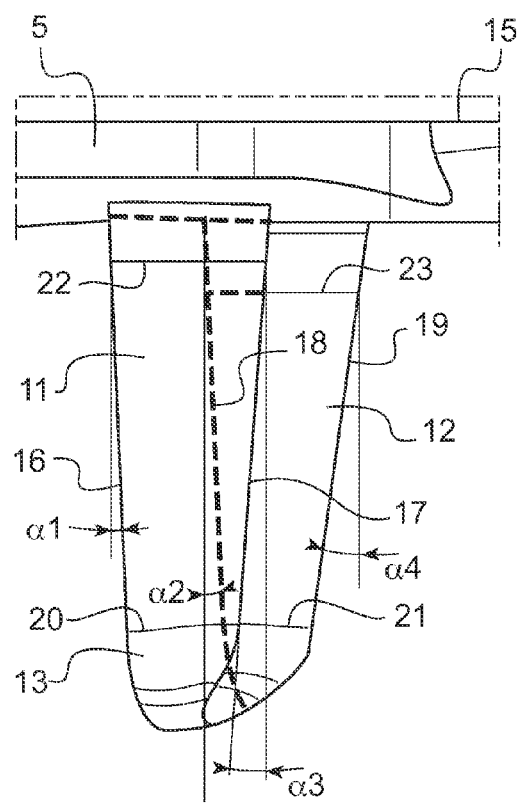
Fig.10

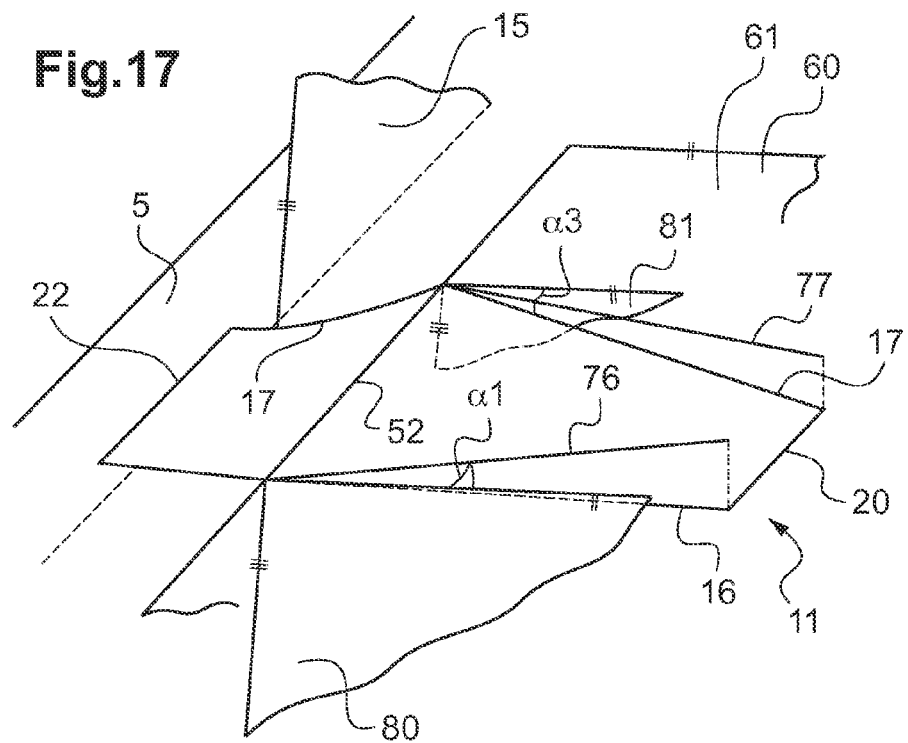
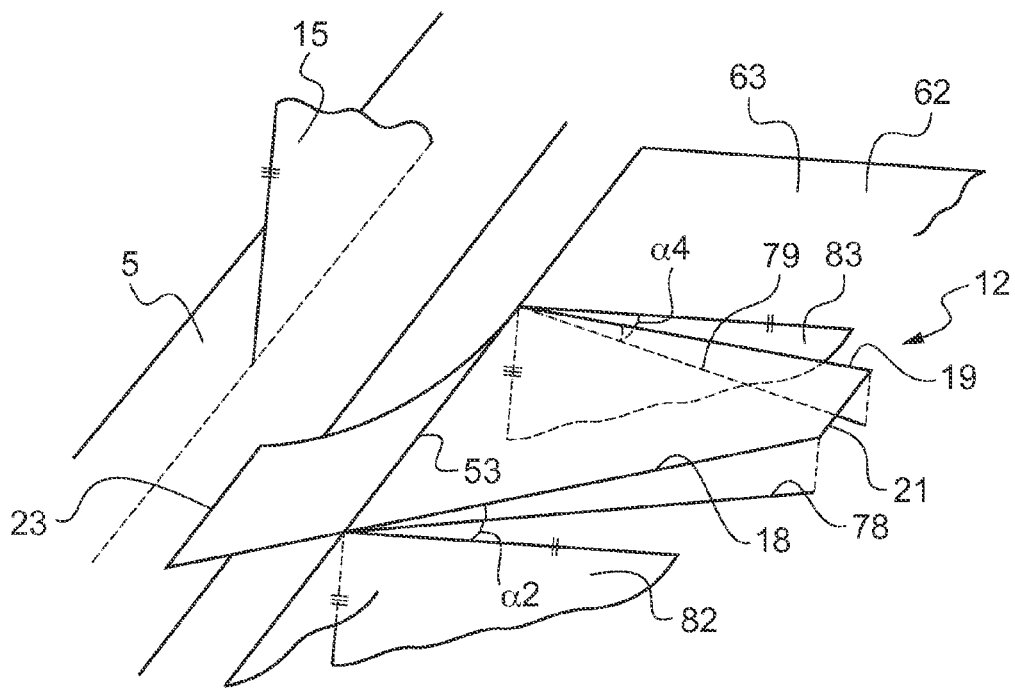

ADVANCED PITCH STABILIZER

CROSS REFERENCE TO RELATED APPLICATION

This application claims priority to European patent application No. EP 13 400035.5 filed on Nov. 29, 2013, the disclosure of which is incorporated in its entirety by reference herein.

BACKGROUND OF THE INVENTION (1) Field of the Invention

The present invention relates to a pitch stabilizer with box configuration suitable for providing stability to aircrafts, and in particular to rotorcrafts.

Conventionally, a rotorcraft comprises an airframe extending longitudinally from the nose of a fuselage to a vertical fin, transversally on either side of a vertical mid-plane, and in a vertical direction from a bottom portion fitted with landing gear to a top portion fitted with a main lift and propulsion rotor. The fuselage can comprise a substantially longitudinal tailboom carrying a fin at its end.

(2) Description of Related Art

A rotorcraft generally comprises stabilizer surfaces. The rotorcraft may be provided with a yaw stabilizer surface in order to compensate, at high speed, the torque exerted by the main rotor on the fuselage.

Similarly, a helicopter sometimes has a pitch stabilizer comprising, for example, two pitch stabilizing surfaces extending symmetrically on either side of the vertical mid-plane. Such pitch stabilizer is often referred to as a "horizontal stabilizer".

The flow of air induced by the main rotor of the rotorcraft is known as downwash. The impact of the downwash on the pitch stabilizer causes several difficulties which are especially relevant in the transition between hover flight and high speed cruise conditions. During this transition phase, the pitch stabilizer experiences great changes in the induced flow field, which implies variations in the forces exerted on the stabilizer and in the aerodynamic efficiency.

Particularly, the variation of forces can lead, when the main rotor head is articulated, to a change in the fuselage pitch attitude known as hump phenomenon. When the main rotor head is bearingless, said variation of forces can lead to a notable increase in the rotor mast moments known as pitch-up problem.

Some prior art documents have already considered such problems, and among the proposed solutions there are some disclosing bi-plane pitch stabilizers.

In document EP0229896, two separate pitch stabilizers are located at the aft of the tailboom. One stabilizer is located on top of the fin, the other on its lowest position. The patent does not deal with the pitch-up problem or the hump phenomenon.

Documents U.S. Pat. No. 2,369,652 and GB606420 disclose a bi-plane pitch stabilizer comprising an upper and a lower horizontal surface.

Document US20120018570 also describes a method of minimizing the hump phenomenon by means of a bi-plane pitch stabilizer.

Document U.S. Pat. No. 3,902,688 describes a rotorcraft pitch stabilizer configuration that has for object to improve the pitch stability. The two pitch stabilizers are mounted at the upper and lower tips of a vertical fin, which extends above and below the tailboom so that the stabilizers are located outside the fuselage wake in forward flight. The two pitch stabilizers do not affect each other aerodynamically.

Differently to those bi-plane configurations, document U.S. Pat. No. 3,706,432 discloses a pitch stabilizer unit mounted on the tailboom and which includes a torque tube mechanism.

BRIEF SUMMARY OF THE INVENTION

The present invention aims to at least reduce the pitch-up problem and the hump phenomenon. For that, the claimed invention provides a pitch stabilizer with box configuration suitable for providing stability to a rotorcraft comprising a vertical mid-plane and a fuselage, the pitch stabilizer comprising:

one or two pitch stabilizing assemblies, with no more than one pitch stabilizing assembly on each side of the vertical mid-plane, wherein each pitch stabilizing assembly comprises:

one anhedral upper pitch stabilizing means extending transversally in span from an upper inner airfoil to an upper outer airfoil; and extending longitudinally in chord from an upper leading edge to an upper trailing edge; the chord variation in span being, between an upper longest airfoil and the upper outer airfoil, a tapered variation, with the chord decreasing from the upper longest airfoil to the upper outer airfoil, one dihedral lower pitch stabilizing means extending transversally in span from a lower inner airfoil to a lower outer airfoil, and extending longitudinally in chord from a lower leading edge to a lower trailing edge; the chord variation in span being, between a lower longest airfoil and the lower outer airfoil, a tapered variation with the chord decreasing from the lower longest airfoil to the lower outer airfoil, one wing tip element extending in elevation between the upper outer airfoil and lower outer airfoil, and wherein, for each pitch stabilizing assembly:
the pitch stabilizing means are forwardly offset in the longitudinal direction from the lower pitch stabilizing means by a longitudinal distance of between 0.5 and 3 times a predetermined reference chord of the upper pitch stabilizing means, the upper pitch stabilizing means are upwardly offset in the elevation direction from the lower pitch stabilizing means by a vertical distance of between 0.5 and 3 times a predetermined reference chord of the upper pitch stabilizing means, the distance between the vertical mid-plane and the point of the pitch stabilizer furthest from the vertical mid-plane is comprised between 0.5 times and once the width of the fuselage.

Rotorcrafts comprise a vertical mid-plane, in occasions a plane of symmetry, which crosses the rotorcraft from the nose of the fuselage to the end of the fin. The vertical mid-plane comprises a longitudinal axis along which the tailboom of the rotorcraft substantially extends and a vertical axis extending in the elevation direction, substantially the direction of rotation of the rotorcraft's rotor, perpendicular to the longitudinal axis.

All planes comprising this vertical axis or an axis parallel to such vertical axis are vertical planes. The planes perpendicular to the vertical axis are horizontal planes.

A third axis is defined in the transversal direction, perpendicular to both the vertical axis and the longitudinal axis.

The term "forward" relates to the direction extending from the fin towards the nose of the fuselage along the longitudinal axis. "Upwards" relates to the direction extending from the base of the fuselage towards the rotor along the vertical axis.

Wings with closed configurations are formed by two surfaces in different planes, joined structurally at or near the tips in some way. A particular case of such configurations are box type arrangements as in the pitch stabilizer of the present invention, wherein the upper and lower planes are joined by a vertical part between their tips. The design of the present invention is suitable for stiffening the structure and reducing aerodynamic losses at the tips.

The pitch stabilizer is configured to provide a pitching moment around the center of gravity of an aircraft so that the aircraft is longitudinally stable. Therefore, the claimed invention is suitable for providing stability to rotorcrafts.

The pitch stabilizer of the present invention is formed by at least two stabilizing surfaces, referred to as pitch stabilizing means.

In an embodiment, the pitch stabilizer is asymmetrical with respect to the mid-plane. The pitch stabilizer comprises, at the same side of the mid-plane, an upper pitch stabilizing means and a lower pitch stabilizing means joined by means of a wing tip element which extends substantially in elevation, that is, in the vertical direction. This configuration is thus formed by one pitch stabilizing assembly, on one side of the vertical mid-plane, comprising an upper pitch stabilizing means, a lower pitch stabilizing means and a wing tip element.

In another embodiment, the arrangement is symmetrical. The pitch stabilizer comprises four stabilizing surfaces and two wing tip elements divided in two pitch stabilizing assemblies. Concretely, the pitch stabilizer is provided with a pitch stabilizing assembly on each side of the vertical mid-plane, each comprising one upper pitch stabilizing means and one lower pitch stabilizing means joined by a wing tip element.

Each pitch stabilizing means extend transversally in span from an inner airfoil to an outer airfoil to which the wing tip element is directly connected. The terms "inner" and "outer" are used since the inner airfoil is closer to the vertical mid-plane than the outer airfoil. Longitudinally, the pitch stabilizing means are limited by a leading edge and a trailing edge.

The pitch stabilizing means are tapered surfaces, either completely or tapered from a certain airfoil, referred to as longest airfoil, to the outer airfoil. Their chord is variable, decreasing from the longest airfoil to the outer airfoil. For the memory, the chord of a surface is the maximum distance between the leading edge and the trailing edge, and the longest airfoil is the airfoil of the pitch stabilizing means having the longest chord. In some embodiments, the upper longest airfoil is the upper inner airfoil and the lower longest airfoil is the lower inner airfoil. In other embodiments, the inner part of the pitch stabilizing means has an increasing chord, from the inner airfoil to the longest airfoil. The remaining part of the pitch stabilizing means, with substantially a bigger surface than the inner part of the pitch stabilizing means, is tapered from the longest airfoil to the outer airfoil.

For each pitch stabilizing assembly, the upper pitch stabilizing means are upwardly offset in the elevation direction with respect to the lower pitch stabilizing means. According to this definition, it can be said that the upper pitch stabilizing means are above the lower pitch stabilizing means. Likewise, the upper pitch stabilizing means are forwardly offset in the longitudinal direction with respect to the lower pitch stabilizing means. This longitudinal offset can also be explained, for each pitch stabilizing assembly, as the distance between the projection on a horizontal plane of the upper leading edge of the upper pitch stabilizing means and the projection on the same horizontal plane of the lower leading edge of the lower pitch stabilizing means.

The distances in which the pitch stabilizing means are upwardly and forwardly offset are given with reference to a predetermined reference chord of the upper pitch stabilizing means. In an embodiment, this reference chord is the mean chord of the upper pitch stabilizing means.

Both the vertical distance in elevation and the longitudinal distance in which the pitch stabilizing means are respectively upwardly and forwardly offset are comprised within 0.5 and 3 times the predetermined reference chord. In a particular example, both the longitudinal distance and the distance in elevation have the same values.

The pitch-up problem and the hump phenomenon can occur in the transition phase between hover flight and cruise flight, when the direction of the main rotor downwash moves from a substantially vertical direction to a substantially longitudinal direction. The present invention aims to at least reduce such problems by shading the lower pitch stabilizing means with the upper pitch stabilizing means by means of the pitch stabilizing means being forwardly and upwardly offset. The term "shading the lower pitch stabilizing means" refers to protecting the lower pitch stabilizing means from the downwash.

The claimed offset distances are moreover suited to improve the aerodynamic performances of the pitch stabilizer. The vertical distance in which the pitch stabilizing means are upwardly offset and its relation to the longitudinal distance in which the pitch stabilizing means are forwardly offset help to improve the sideward flight conditions and the efficiency in high speed forward flight.

The upper pitch stabilizing means are anhedral and the lower pitch stabilizing means are dihedral. The terms anhedral and dihedral define the acute angle in elevation between the pitch stabilizing means and a horizontal plane. Concretely, the acute angle between:

the projection of the quarter chord line of the pitch stabilizing means over a vertical plane perpendicular to the vertical mid-plane which passes through the intersection of this quarter chord line and the inner airfoil of the pitch stabilizing means, and the horizontal plane that passes through the intersection of such quarter chord line and the inner airfoil of the pitch stabilizing means.

The quarter chord line is the line joining each point belonging to the chord of each airfoil located at the first quarter going from the leading edge to the trailing edge of the airfoil. The quarter chord line of the upper pitch stabilizing means is referred to as upper quarter chord line; the quarter chord line of the lower pitch stabilizing means is referred to as lower quarter chord line.

When the angle in elevation is such that the mentioned horizontal plane is, using the defined references in elevation, above the corresponding pitch stabilizing means, these pitch stabilizing means are anhedral. When the angle is such that the horizontal plane is below the corresponding pitch stabilizing means, the pitch stabilizing means are dihedral. The terms anhedral and dihedral are well known by the person skilled in aeronautics.

The configuration of the claimed invention presents anhedral upper pitch stabilizing means and dihedral lower pitch stabilizing means, which can provide at least one of the following technical advantages: contributing to the shading of the lower pitch stabilizing means, thus improving the behaviour in the transition between hover and cruise flights; and reducing the projection of the pitch stabilizer over the vertical mid-plane, which maximizes the efficiency of the pitch stabilizer and the handling quality of a rotorcraft in sideward and quartering flight conditions. Quartering flight conditions are those wherein the rotorcraft hovers with a wind of, approximately, 45° with respect to the vertical mid-plane.

The wing tip elements play the role of also improving the aerodynamic effectiveness of the pitch stabilizer while satisfying the construction requirements in terms of rigidity, reduction of vibrations and static stability. The box configuration with wing tip elements is adequate for diminishing the induced vortices in the pitch stabilizing means and, therefore, reducing the drag.

Moreover, the projection of the wing tip elements over the vertical mid-plane is reduced to the minimum for attaining the described easier handling in sideward and quartering conditions. The claimed anhedral/dihedral and tapered arrangements allow minimizing such projection.

The distance in the transversal direction between the vertical mid-plane and the point of the pitch stabilizer furthest from such mid-plane is between 0.5 and 1 times the width of the fuselage. This design does equally mitigate the pitch-up phenomenon and the pitch-up problem. The term "width of the fuselage" refers to the maximum width, which is calculated as the addition of the transversal distances from the point of the fuselage furthest from the vertical mid-plane on each side of the vertical mid-plane to the vertical mid-plane itself.

Consequently, the overall arrangement of the pitch stabilizer with box configuration, with tapered or mostly tapered and anhedral/dihedral pitch stabilizing means, with a span equal to or bigger than the width of the fuselage, and with wing tip elements with a reduced projection over the vertical mid-plane, presents advantages such as better aerodynamic effectiveness, less vibrations, less induced vortices, less drag and more rigidity, while limiting disadvantages like a worst handling quality of the rotorcraft in quartering and sideward flight conditions. Besides, the particular claimed geometry of all the elements and of the way they are linked surprisingly manages to solve the problems of instability that happens when changing from hover to cruise flight conditions.

Moreover, such configuration is advantageous in that it allows a higher manoeuvrability in ground operations and in that its integrated design leads to minimal production costs.

The tapered variation of the chord of the pitch stabilizing means and their anhedral and dihedral angling employed to achieve these advantages have, in particular examples, values that optimize such improvements.

The tapering of the pitch stabilizing means, either total or partial, is defined by the acute angles formed by:
the projection of a segment of the leading—or the trailing—edge extending from the longest airfoil to the outer airfoil over a horizontal plane which passes through the intersection of the longest airfoil and the leading—or the trailing—edge,
with a vertical plane, perpendicular to the vertical mid-plane, which passes through the intersection of the longest airfoil and the leading—or the trailing—edge.

These angles are such that the vertical plane, perpendicular to the vertical mid-plane, which passes through the intersection of the longest airfoil and the leading edge of the pitch stabilizing means is more forward than the segment of the leading edge extending from the longest airfoil to the outer airfoil. Likewise, the segment of the trailing edge extending from the longest airfoil to the outer airfoil is more forward than the vertical plane, perpendicular to the vertical mid-plane, which passes through the intersection of the inner airfoil and the trailing edge.

In an embodiment, the following elements are defined:
a first horizontal plane which passes through the intersection of the upper longest airfoil and the upper leading edge,
a first projection of a segment of the upper leading edge extending from the upper longest airfoil to the upper outer airfoil over the first horizontal plane, and
a first vertical plane, perpendicular to the vertical mid-plane, which passes through the intersection of the upper longest airfoil and the upper leading edge, so that an upper leading acute angle $\alpha 1$, ranging between 2 degrees and 45 degrees, is formed between the first projection and the first vertical plane.

In another embodiment, the following elements are defined:
a second horizontal plane which passes through the intersection of the upper longest airfoil and the upper trailing edge,
a second projection of a segment of the upper trailing edge extending from the upper longest airfoil to the upper outer airfoil over the second horizontal plane, and
a second vertical plane, perpendicular to the vertical mid-plane, which passes through the intersection of the upper longest airfoil and the upper trailing edge, so that an upper trailing acute angle $\alpha 3$, ranging between 2 degrees and 45 degrees, is formed between the second projection and the second vertical plane.

In another embodiment, the following elements are defined:
a third horizontal plane which passes through the intersection of the lower longest airfoil and the lower leading edge,
a third projection of the segment of the lower leading edge extending from the lower longest airfoil to the lower outer airfoil over the third horizontal plane, and
a third vertical plane, perpendicular to the vertical mid-plane, which passes through the intersection of the lower longest airfoil and the lower leading edge, so that a lower leading acute angle $\alpha 2$, ranging between 2 degrees and 45 degrees, is formed between the third projection and the third vertical plane.

In another embodiment, the following elements are defined:
a fourth horizontal plane which passes through the intersection of the lower longest airfoil and the lower trailing edge,
a fourth projection of the segment of the lower trailing edge extending from the lower longest airfoil to the lower outer airfoil over the fourth horizontal plane,
a fourth vertical plane, perpendicular to the vertical mid-plane, which passes through the intersection of the lower longest airfoil and the lower trailing edge, so that a lower trailing acute angle $\alpha 4$, ranging between 2 degrees and 45 degrees, is formed between the fourth projection and the fourth vertical plane.

In the embodiments wherein there is a total tapering, the longest airfoil corresponds to the inner airfoil and the whole leading edge or trailing edge are taken into account for the projections above explained.

Similarly, some embodiments present more particularly advantageous cases of the anhedral/dihedral configuration of the pitch stabilizing means.

In an embodiment, the following elements are defined:
a fifth vertical plane, perpendicular to the vertical mid-plane, which passes through the intersection of the upper quarter chord line of the upper pitch stabilizing means and the upper inner airfoil,
a fifth projection of the upper quarter chord line of the upper pitch stabilizing means over the fifth vertical plane, a fifth horizontal plane perpendicular to the vertical mid-plane, extending in the longitudinal direction and which passes through the intersection of the upper inner airfoil and the upper quarter chord line of the upper pitch stabilizing means, so that a superior acute angle $\beta 1$, ranging between 2 degrees and 45 degrees, is formed between the fifth projection and the fifth horizontal plane.

In another embodiment, the following elements are defined:
  a sixth vertical plane, perpendicular to the vertical mid-plane, which passes through the intersection of the lower quarter chord line of the lower pitch stabilizing means and the lower inner airfoil,
  a sixth projection of the lower quarter chord line of the lower pitch stabilizing means over the sixth vertical plane,
  a sixth horizontal plane perpendicular to the vertical mid-plane, extending in the longitudinal direction and which passes through the intersection of the lower inner airfoil and the lower quarter chord line of the lower pitch stabilizing means, so that an inferior acute angle $\beta 2$, ranging between 2 degrees and 45 degrees, is formed between the sixth projection and the sixth horizontal plane.

The wing tip elements may also present, in some embodiments, particular configurations that enhance even more the advantages already explained.

In an embodiment, each wing tip element comprises at least three sections:
  a first section, directly connected to the upper edge airfoil, whose quarter chord line is formed by one or more circular arcs;
  a second section, directly connected to the lower outer airfoil, whose quarter chord line is also formed by one or more circular arcs;
  and a third section whose quarter chord line is a straight line tangent to the quarter chord lines of the first and the second sections, said third section having a chord whose length is equal to or smaller than the predetermined reference chord of the upper pitch stabilizing means.

The narrowing of the third section minimizes the projection of the wing tip elements over the vertical mid-plane.

A particular example of this embodiment specifies a preferred geometry, in terms of the explained purposes of the wing tip elements, of the first and second sections. Concretely, the quarter chord line of the first section and the quarter chord line of the second section, in this embodiment, are each made by two circular arcs tangent to one another, the radii of said arcs being comprised between 0.01 and 4 times the predetermined reference chord of the upper pitch stabilizing means.

It is also an object of the present invention to define a rotorcraft comprising the inventive pitch stabilizer, and thus presenting all the technical advantages associated to the stabilizer itself. The claimed rotorcraft does comprise a fuselage, a tailboom extending from the fuselage in an essentially longitudinal direction, and a fin at the end of tailboom opposite the fuselage. The inventive pitch stabilizer may be attached either to the tailboom or to the fin. The upper pitch stabilizing means of each pitch stabilizing assembly comprise upper connecting means which attach the upper inner airfoil to the tailboom or the fin; and the lower pitch stabilizing means of each pitch stabilizing assembly comprise lower connecting means which attach the lower inner airfoil to the tailboom or to the fin.

In a particular embodiment, each upper pitch stabilizing means comprise an upper inner structural frame and an upper surface rigidly joined to the upper inner structural frame and located around said upper inner structural frame.

In this embodiment, the upper connecting means comprise, in each upper pitch stabilizing means, an upper bracket rigidly mounted on the upper inner structural frame, and a rotational shaft, rigidly attached to the upper bracket and suitable for rotating around a top mount rigidly connected to the tailboom or the fin.

Furthermore, each lower pitch stabilizing means comprise a lower inner structural frame and a lower surface rigidly joined to the lower inner structural frame and located around said upper inner structural frame.

Likewise, the lower connecting means comprise, in each lower pitch stabilizing means, a lower bracket rigidly mounted on the lower inner structural frame, each lower bracket comprising a screw. The lower connecting means further comprise a lower mount in turn comprising, at each side of the vertical mid-plane, at least two inserts, so that the screw of each lower bracket can alternatively be inserted in one of the at least two inserts of the corresponding side of the vertical mid-plane, thus allowing the rotation of the pitch stabilizer around the rotational shaft of the upper connecting means.

The connecting means of this embodiment permit that the pitch stabilizer suffers less flight loads, as a consequence of the possible adjustment of the orientation of the pitch stabilizing means. Besides, the screw/insert way of fixing the position increases the stability of the construction against vibration and against the aerodynamic forces caused by the downwash of the rotor.

In a particular example, the top mount comprises active means suitable for remotely controlling the rotation of the rotational shaft. In this embodiment there is no need of manual adjustment of the orientation of the stabilizer.

The embodiment wherein the pitch stabilizer is attached to the fin presents some additional advantages concerning the stability and controllability of the rotorcraft in descent, autorotation and in pitch-down flight conditions.

BRIEF DESCRIPTION OF THE SEVERAL
VIEWS OF THE DRAWINGS

These and other features and advantages of the invention will become more evident from the following detailed description of preferred embodiments, given only by way of illustrative and non-limiting example, in reference to the attached figures:

FIG. 6 is a side view of the pitch stabilizer.

FIG. 7 is a top view of the pitch stabilizer.

FIG. 8 is a top view of the embodiment in which the pitch stabilizer is not single tapered.

FIG. 9 is a top view of the embodiment in which the pitch stabilizer is asymmetrical.

FIG. 10 is a top view of the pitch stabilizer in which the angles defining the tapering of the pitch stabilizing means are shown.

FIG. 17 shows the upper leading acute angle α1 and the upper trailing acute angle α3 defining, in some embodiments, the tapering of the upper pitch stabilizing means.

FIG. 18 shows the lower leading acute angle α2 and the lower trailing acute angle α4 defining, in some embodiments, the tapering of the lower pitch stabilizing means.

DETAILED DESCRIPTION OF THE INVENTION

Figure 1:
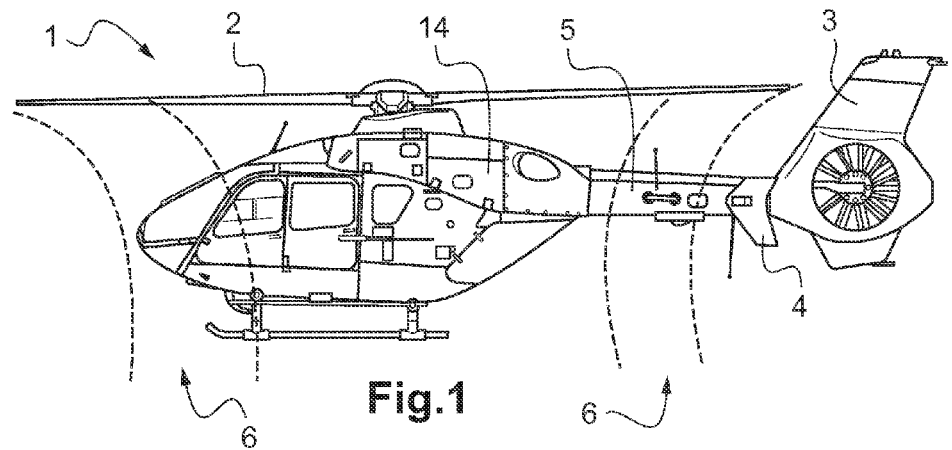
FIG. 1 is a side view of a rotorcraft comprising stabilizers according to the prior art, during hover flight.
Figure 2:
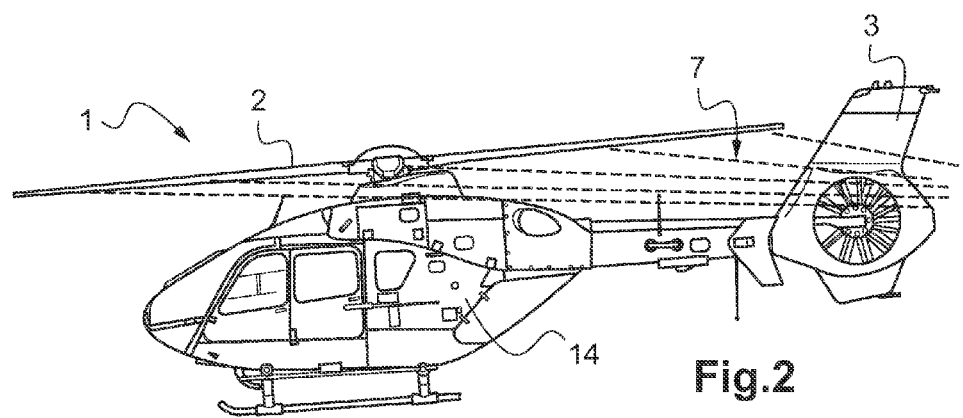
FIG. 2 is a side view of a rotorcraft comprising stabilizers according to the prior art, during cruise flight.
Figure 3:
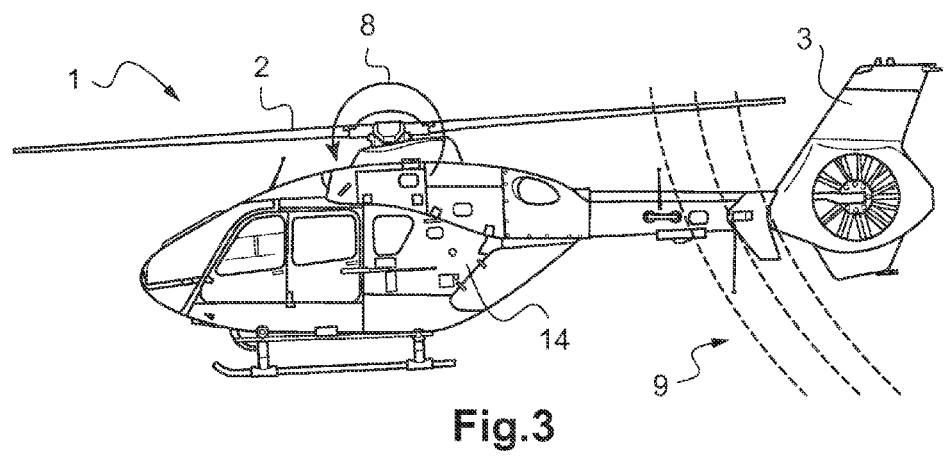
FIG. 3 is a side view of a rotorcraft comprising stabilizers according to the prior art, during the transition between hover flight and cruise flight.

FIGS. 1, 2 and 3 show a rotorcraft 1 according to the prior art comprising a main rotor 2, a fuselage 14 comprising a tailboom 5 extending from the fuselage 14 in the longitudinal direction along a vertical anteroposterior mid-plane, a vertical stabilizer 3 and a pitch stabilizer 4.

FIG. 1 shows the effect of the downwash provoked by the main rotor 2 of a rotorcraft 1 on the pitch stabilizers of the prior art 4, mounted on the tailboom 5.

In hover flight, the vertical airflow 6 of the main rotor 2 is directed downwardly along a vertical direction. Due to this, great forces act on the pitch stabilizing surfaces. This condition may appear during take-off, hover above ground and hover out of ground.

If the rotorcraft 1 is moving at cruise flight conditions as in FIG. 2 the downwash of the main rotor 2 is directed backwardly along a longitudinal axis, hitting the pitch stabilizing surface mainly in the longitudinal airflow 7 direction.

In the transition between both mentioned flight conditions, hover flight and cruise flight, the pitch stabilizing surface experiences a great change in the flow field around it, and consequently the forces on the pitch-stabilizing surface vary. The transition airflow 9 will have a direction between such vertical and longitudinal directions, as shown in FIG. 3. The change in force will lead either to a variance in the rotorcraft fuselage pitch attitude, when using an articulated main rotor head, or to an increase of the rotor mast moments 8, in the case of a bearingless main rotor head.

Figure 4:
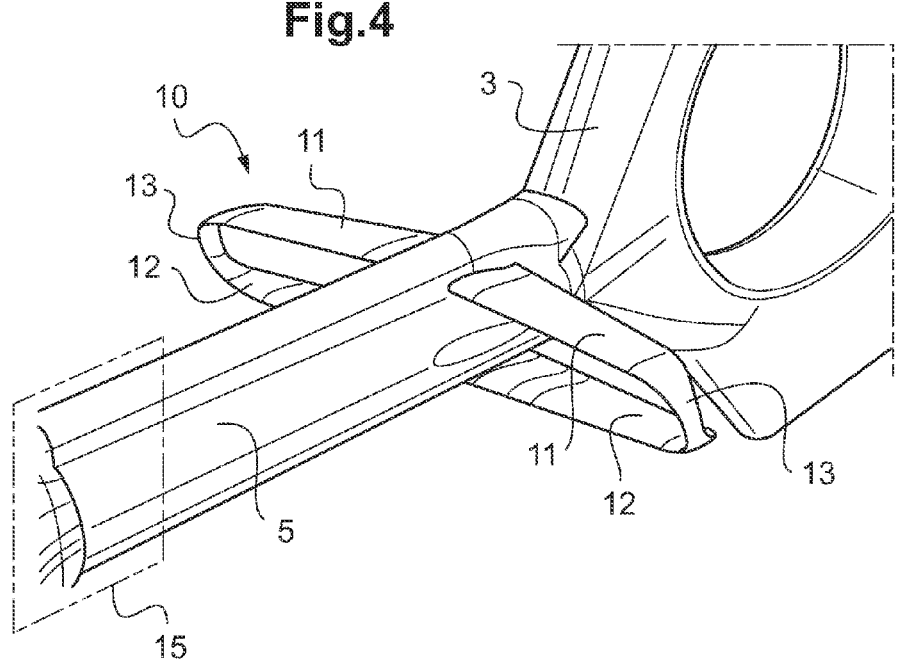
FIG. 4 represents a perspective view of a pitch stabilizer according to the present invention.

FIG. 4 depicts an embodiment of the pitch stabilizer 10 according to the present invention, symmetrical with respect to the vertical mid-plane 15. Whatever the embodiment, the pitch stabilizer 10 is provided with at least one pitch stabilizing assembly. Such pitch stabilizing assembly comprises an upper and a lower pitch stabilizing means 11, 12 attached to the tailboom 5, and linked between them by means of a wing tip element 13. Each pitch stabilizing mean is an aerodynamic surface.

According to the FIG. 4, two pitch stabilizing assemblies are arranged symmetrically on both sides of the vertical mid-plane 15.

Figure 5:
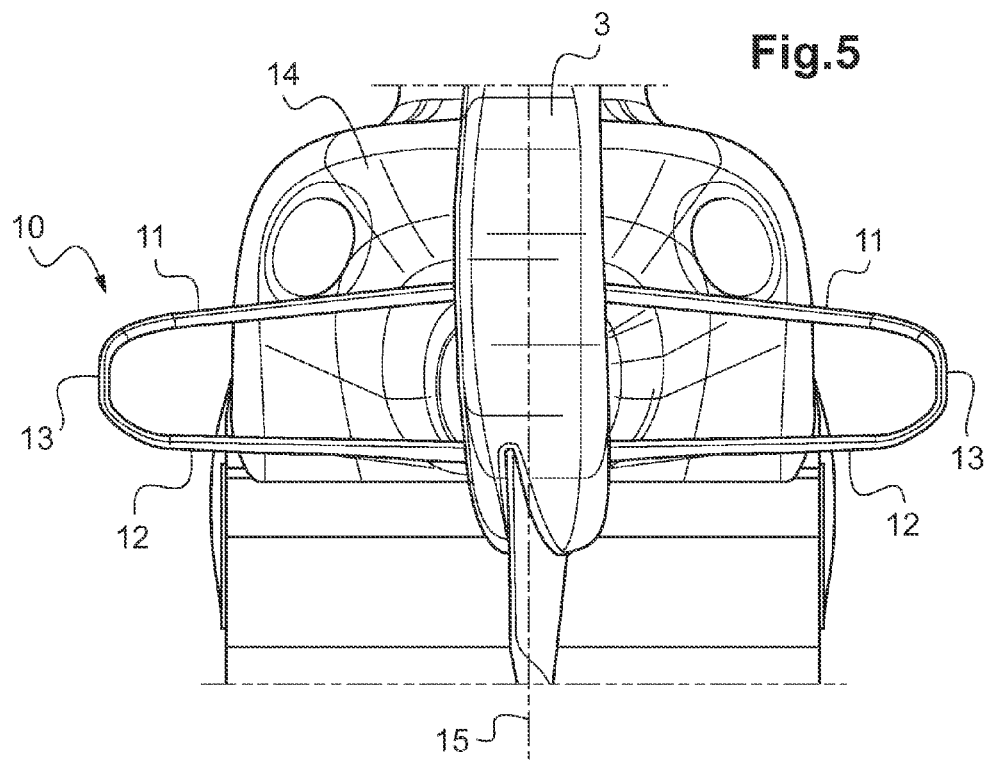
FIG. 5 is a rear cross sectional view of the pitch stabilizer.

FIG. 5 is a rear cross sectional view of this embodiment.

FIGS. 4 and 5 show that the upper pitch stabilizing means 11 are anhedral, the lower pitch stabilizing means 12 are dihedral, and both of them are tapered.

The lateral view of FIG. 6 shows that the combination of anhedral/dihedral and tapered configurations leads to a minimum projection of the wing tip element 13 over the vertical mid-plane 15.

FIG. 7 is a top view of such configurations, which shows that the upper pitch stabilizing means 11 extend longitudinally in chord from an upper leading edge 16 to an upper trailing edge 17, and transversally in span from an upper inner airfoil 22 to an upper outer airfoil 20. Likewise, the lower pitch stabilizing means 12 extend longitudinally in chord from a lower leading edge 18 to a lower trailing edge 19, and transversally in span from a lower inner airfoil 23 to a lower outer airfoil 21. The lower outer airfoil 21 and the upper outer airfoil 20 of a pitch stabilizing assembly are joined by the wing tip element 13. This FIG. 7 does also show a distance 25 between the vertical mid-plane 15 and the point of the pitch stabilizer 10 furthest from the vertical mid-plane 15.

FIG. 8 shows a particular embodiment wherein the upper longest airfoil 52 of an upper pitch stabilizing mean and the lower longest airfoil 53 of an lower pitch stabilizing mean do not coincide with the upper inner airfoil 22 and the lower inner airfoil 23, respectively. Thus the tapering of this embodiment is defined by the decreasing chord between the upper longest airfoil 52 and the upper outer airfoil 20 for the upper pitch stabilizing means 11, and the decreasing chord between the lower longest airfoil 53 and the lower outer airfoil 21 for the lower pitch stabilizing means 12.

FIG. 9 represents an embodiment wherein the pitch stabilizer 10 is asymmetrical, thus having only one pitch stabilizing assembly comprising one upper pitch stabilizing means 11, one lower pitch stabilizing means 12 and one wing tip element 13, all of them at the same side of the vertical mid-plane 5.

FIG. 10 shows in greater detail the upper leading acute angle α1, the lower leading acute angle α2, the lower trailing acute angle α3 and the lower trailing acute angle α4 that, in some embodiments, define the tapering of the upper and lower pitch stabilizing means 11, 12. Since such upper and lower pitch stabilizing means 11, 12 are anhedral and dihedral respectively, they are not contained in a horizontal plane. For that reason, the tapering angles, in this case in which the whole pitch stabilizing means 11, 12 are single tapered, are defined taking into account the projection of the leading and trailing edges 16, 17, 18, 19 over an horizontal plane, concretely the horizontal plane that passes through the intersection of such leading or trailing edges 16, 17, 18, 19 and the corresponding inner airfoil 22, 23. Then, the acute angles α1, α2, α3, α4 are defined as the angles between said projections and the vertical plane perpendicular to the vertical mid-plane that passes through the intersection of such leading or trailing edges 16, 17, 18, 19 and the corresponding inner airfoil 22, 23.

FIGS. 17 and 18 depict these angles in greater detail.

Figure 11:
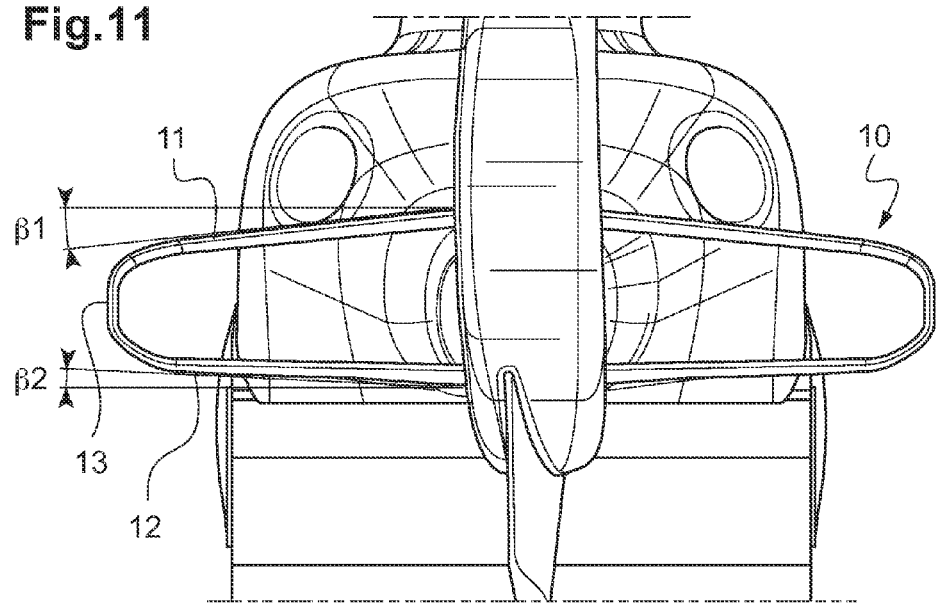
FIG. 11 is a rear cross sectional view of the pitch stabilizer in which the angles defining the anhedral/dihedral configuration of the pitch stabilizing means are shown.

Likewise, due to the tapering, the quarter chord lines 90, 92 of the upper and lower pitch stabilizing means 11, 12 are not contained in a vertical plane. In consequence, the anhedral and dihedral angles are defined from a projection of such quarter chord lines 90, 92 over a vertical plane, namely the vertical plane perpendicular to the vertical mid-plane that passes through the intersection of the quarter chord lines and the corresponding inner airfoil 22, 23. Then, in particular embodiments, the superior and inferior acute angles β1 and β2, as shown in FIG. 11, are those between said projections and the horizontal plane that passes through the intersection of the quarter chord line and the corresponding inner airfoil 22, 23.

Figure 19:
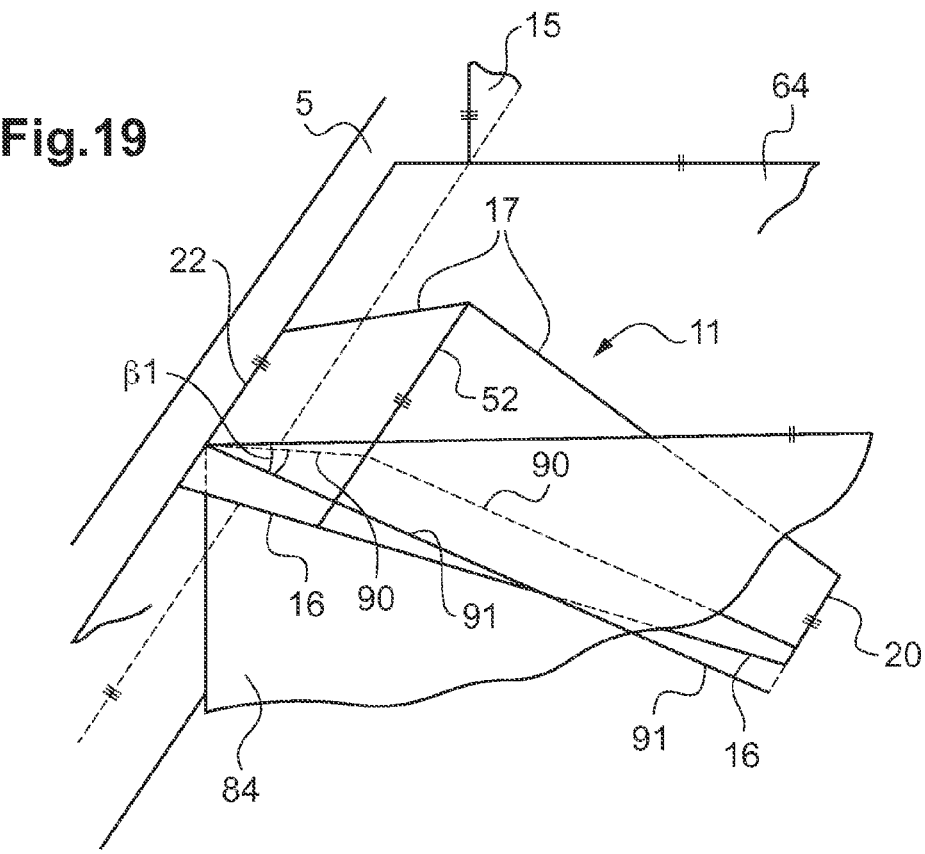
FIG. 19 shows the superior acute angle β1 defining, in some embodiments, the anhedral configuration of the upper pitch stabilizing means.
Figure 20:
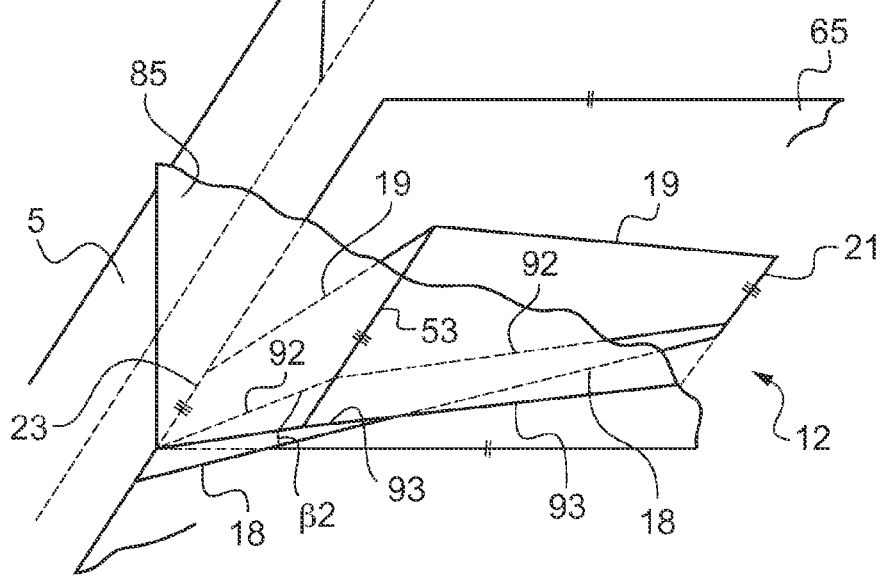
FIG. 20 shows the inferior acute angle β2 defining, in some embodiments, the dihedral configuration of the lower pitch stabilizing means.

Similarly, FIGS. 19 and 20 go deeper into the definition of these angles.

Figure 12:
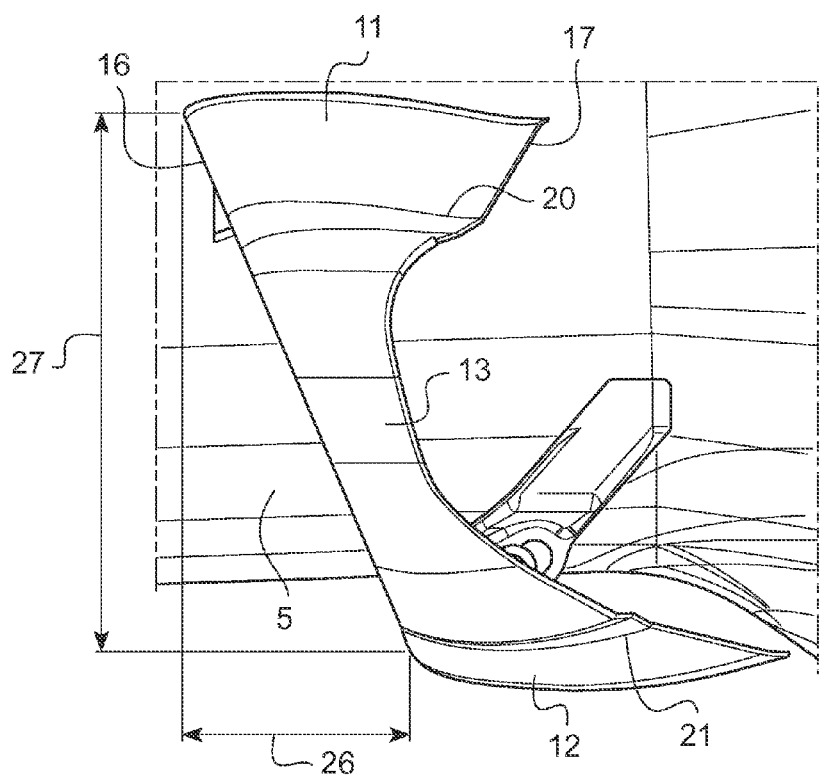
FIG. 12 is a side view of the pitch stabilizer wherein the distances in which the upper pitch stabilizing means are forwardly offset in the longitudinal direction and upwardly offset in the elevation direction from the lower pitch stabilizing means of the same pitch stabilizing assembly are shown.
Figure 13:
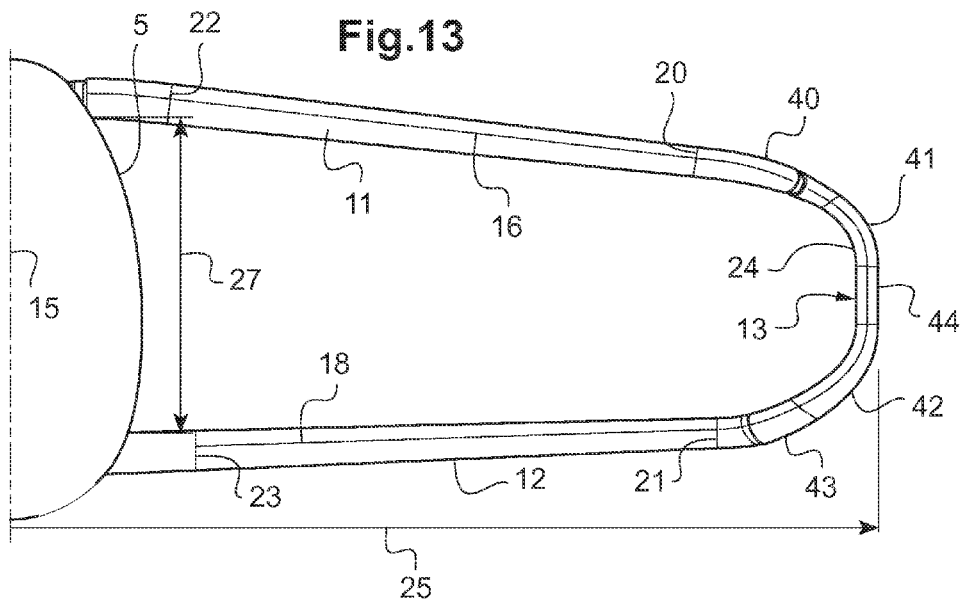
FIG. 13 is a cross sectional view of the pitch stabilizer in which the sections of the wing tip element are shown.

As depicted in FIGS. 12 and 13, and in order to notably achieve the commented shading effects, each upper pitch stabilizing means 11 are upwardly offset in the elevation direction from the corresponding lower pitch stabilizing means 12 by a vertical distance 27 of between 0.5 and 3 times a predetermined reference chord of the upper pitch stabilizing means 11.

FIG. 12 also shows the longitudinal distance 26 in which the upper pitch stabilizing means 11 are forwardly offset in the longitudinal direction from the lower pitch stabilizing means 12 of the same pitch stabilizing assembly. The longitudinal distance 26 is between 0.5 and 3 times a predetermined reference chord of the upper pitch stabilizing means 11.

According to the FIG. 13, a wing tip element 13 can comprise at least three sections:

a first section 40, 41, directly connected to the upper edge airfoil 20, whose quarter chord line is formed by one or more circular arcs;

a second section 42, 43, directly connected to the lower outer airfoil 21, whose quarter chord line is also formed by one or more circular arcs; and a third section 44 whose quarter chord line is a straight line tangent to the quarter chord lines of the first 40, 41 and the second sections 42, 43.

The length of the chord of the third section 44 is equal to or smaller than the predetermined reference chord of the upper pitch stabilizing means 11.

In the embodiment of FIG. 13, the first section 40, 41 is formed by a first upper subsection 40 and a first lower subsection 41, whose quarter chord lines are each made by a circular arc tangent to one another. The quarter chord line of the first upper section 40 is also tangent to the upper quarter chord line 90 of the upper pitch stabilizing means 11, and the quarter chord line of the first lower subsection 41 is also tangent to the quarter chord line of the third section 44.

Similarly, the second section 42, 43 is formed by a second upper subsection 42 and a second lower subsection 43, whose quarter chord lines are each made by a circular arc tangent to one another. The quarter chord line of the second upper section 42 is also tangent to the quarter chord line of the third section 44, and the quarter chord line of the second lower subsection 43 is also tangent to the quarter chord line 92 of the lower pitch stabilizing means 12.

In an embodiment, the radii of the arcs of the quarter chord lines of the subsections 40, 41, 42, 43 are comprised between 0.01 and 4 times the predetermined reference chord of the upper pitch stabilizing means 11.

Figure 14:
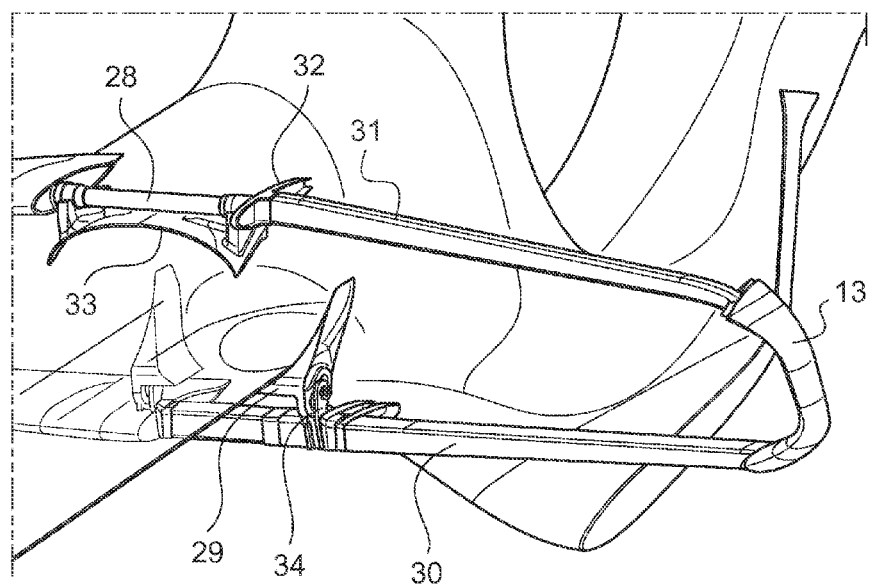
FIG. 14 represents an embodiment of the pitch stabilizing means wherein they comprise inner structural frames and connecting means.

In the particular embodiment of FIG. 14, the upper pitch stabilizing means 11 comprise an upper inner structural frame 31 and an upper surface rigidly joined to the upper inner structural frame 31 and located around said upper inner structural frame 31.

The lower pitch stabilizing means 12 comprise a lower inner structural frame 30 and a lower surface rigidly joined to the lower inner structural frame 30 and located around said lower inner structural frame 30.

Rigidly mounted on the upper inner structural frame 31, there is an upper bracket 32 to which, in turn, a rotational shaft 28 is rigidly attached. Such rotational shaft 28 is suitable for rotating around a top mount 33 rigidly connected to the tailboom 5.

Figure 15:
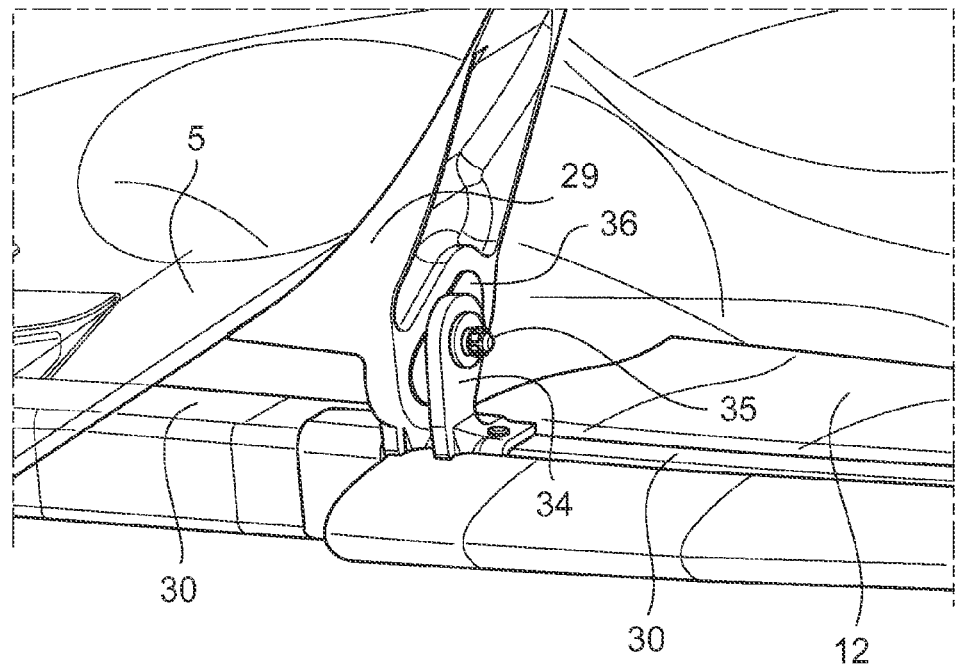
FIG. 15 represents the lower connecting means.

Likewise, rigidly mounted on the lower inner structural frame 30, there is a lower bracket 34 comprising a screw 35. The screw 35 of each lower bracket 34 can alternatively be inserted in one of the two inserts 36 of a lower mount 29, thus allowing the rotation of the pitch stabilizer 10 around the rotational shaft 28. FIG. 15 shows these lower connecting means in greater detail.

Figure 16:
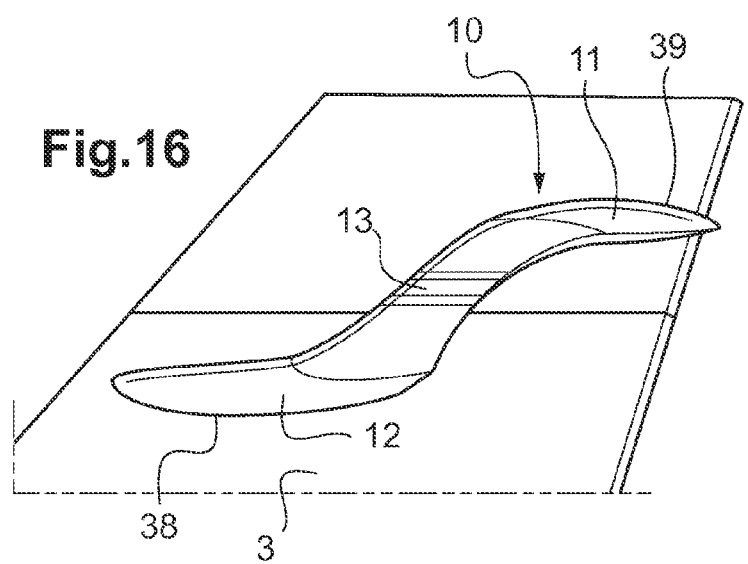
FIG. 16 depicts the embodiment in which the pitch stabilizer is attached to the fin of the rotorcraft.

FIG. 16 shows the particular embodiment wherein the pitch stabilizer 10 is attached to the vertical fin of a rotorcraft, by means of fin upper connecting means 39 and fin lower connecting means 38.

FIGS. 17 and 18 represent in detail the upper leading acute angle α1, the lower leading acute angle α2, the lower trailing acute angle α3 and the lower trailing acute angle α4, in the more general case wherein the tapering is not complete, but between the longest airfoils 52, 53 and the outer airfoils 20, 21 of the pitch stabilizing means 11, 12.

In FIG. 17, the upper leading acute angle α1 is depicted as the angle formed between a first projection 76 and a first vertical plane 80.

The first projection 76 is the projection of the segment of the upper leading edge 16 extending from the upper longest airfoil 52 to the upper outer airfoil 20 over a first horizontal plane 60.

The first horizontal plane 60 is the horizontal plane which passes through the intersection of the upper longest airfoil 52 and the upper leading edge 16.

The first vertical plane 80 is the vertical plane perpendicular to the vertical mid-plane 15 which passes through the intersection of the upper longest airfoil 52 and the upper leading edge 16.

Likewise, in FIG. 17, the upper trailing acute angle α3 is depicted as the angle formed between a second projection 77 and a second vertical plane 81.

The second projection 77 is the projection of the segment of the upper trailing edge 17 extending from the upper longest airfoil 52 to the upper outer airfoil 20 over a second horizontal plane 61, which coincides with the first horizontal plane 60 in this embodiment.

The second horizontal plane 61 is the horizontal plane which passes through the intersection of the upper longest airfoil 52 and the upper trailing edge 17.

The second vertical plane 81 is the vertical plane perpendicular to the vertical mid-plane 15 which passes through the intersection of the upper longest airfoil 52 and the upper trailing edge 17.

In FIG. 18, the lower leading acute angle α2 is depicted as the angle formed between a third projection 78 and a third vertical plane 82.

The third projection 78 is the projection of the segment of the lower leading edge 18 extending from the lower longest airfoil 53 to the lower outer airfoil 21 over a third horizontal plane 62.

The third horizontal plane 62 is the horizontal plane which passes through the intersection of the lower longest airfoil 53 and the lower leading edge 18.

The third vertical plane 82 is the vertical plane perpendicular to the vertical mid-plane 15 which passes through the intersection of the lower longest airfoil 53 and the lower leading edge 18.

Likewise, in FIG. 18, the lower trailing acute angle α4 is depicted as the angle formed between a fourth projection 79 and a fourth vertical plane 83.

The fourth projection 79 is the projection of the segment of the lower trailing edge 19 extending from the lower longest airfoil 53 to the lower outer airfoil 21 over a fourth horizontal plane 63, which coincides with the third horizontal plane 62 in this embodiment.

The fourth horizontal plane 63 is the horizontal plane which passes through the intersection of the lower longest airfoil 53 and the lower trailing edge 19.

The fourth vertical plane 83 is the vertical plane perpendicular to the vertical mid-plane 15 which passes through the intersection of the lower longest airfoil 53 and the lower trailing edge 19.

FIGS. 19 and 20 represent in detail the superior and inferior acute angles β1 and β2.

In FIG. 19, the superior acute angle β1 is depicted as the angle formed between a fifth projection 91 and a fifth horizontal plane 64.

The fifth projection 91 is the projection of the upper quarter chord line 90 over a fifth vertical plane 84.

The fifth vertical plane 84 is the vertical plane perpendicular to the vertical mid-plane 15 which passes through the intersection of the upper quarter chord line 90 and the upper inner airfoil 22.

The fifth horizontal plane 64 is the horizontal plane perpendicular to the vertical mid-plane 15, extending in the longitudinal direction and which passes through the intersection of the upper inner airfoil 22 and the upper quarter chord line 90.

In FIG. 20, the inferior acute angle β2 is depicted as the angle formed between a sixth projection 93 and a sixth horizontal plane 65.

The sixth projection 93 is the projection of the lower quarter chord line 92 over a sixth vertical plane 85.

The sixth vertical plane 85 is the vertical plane perpendicular to the vertical mid-plane 15 that passes through the intersection of the lower quarter chord line 92 and the lower inner airfoil 23.

The sixth horizontal plane 65 is the horizontal plane perpendicular to the vertical mid-plane 15, extending in the longitudinal direction and which passes through the intersection of the lower inner airfoil 23 and the lower quarter chord line 92.

REFERENCE LIST

1.—Rotorcraft
2.—Main rotor
3.—Vertical stabilizing means according to the prior art
4.—Horizontal stabilizing means according to the prior art
5.—Tailboom
6.—Vertical airflow
7.—Longitudinal airflow
8.—Rotor mast moment
9.—Transitional airflow
10.—Pitch stabilizer according to the present invention
11.—Upper pitch stabilizing means
12.—Lower pitch stabilizing means
13.—Wing tip element
14.—Fuselage
15.—Vertical mid—plane
16.—Upper leading edge
17.—Upper trailing edge
18.—Lower leading edge
19.—Lower trailing edge
20.—Upper outer airfoil
21.—Lower outer airfoil
22.—Upper inner airfoil
23.—Lower inner airfoil
25.—Distance between the vertical mid-plane and the point of the pitch stabilizer furthest from the vertical mid—plane.
26.—Longitudinal distance in which the upper pitch stabilizing means are forwardly offset from the lower pitch stabilizing means.
27.—Vertical distance in which the upper pitch stabilizing means are offset in elevation from the lower pitch stabilizing means.
28.—Rotational shaft
29.—Lower mount
30.—Lower inner structural frame
31.—Upper inner structural frame
32.—Upper bracket
33.—Top mount
34.—Lower bracket
35.—Screw
36.—Inserts
38.—Fin lower connecting means
39.—Fin upper connecting means
40.—First upper subsection of the wing tip element
41.—First lower subsection of the wing tip element
42.—Second upper subsection of the wing tip element
43.—Second lower subsection of the wing tip element
44.—Third section of the wing tip element
52.—Upper maximum airfoil
53.—Lower maximum airfoil
60.—First horizontal plane
61.—Second horizontal plane
62.—Third horizontal plane
63.—Fourth horizontal plane
64.—Fifth horizontal plane
65.—Sixth horizontal plane
76.—First projection
77.—Second projection
78.—Third projection
79.—Fourth projection
80.—First vertical plane
81.—Second vertical plane
82.—Third vertical plane
83.—Fourth vertical plane
84.—Fifth vertical plane
85.—Sixth vertical plane
90.—Upper quarter chord line
91.—Fifth projection
92.—Lower quarter chord line
93.—Sixth projection
α1.—Upper leading acute angle
α2.—Lower leading acute angle
α3.—Upper trailing acute angle
α4.—Lower trailing acute angle
β1.—Superior acute angle
β1.—Inferior acute angle

What is claimed is:

1. A rotorcraft comprising a vertical mid-plane, a fuselage, a tailboom, a fin and a pitch stabilizer, wherein the pitch stabilizer has box configuration suitable for providing stability to the rotorcraft;

the pitch stabilizer comprising one or two pitch stabilizing assemblies, with no more than one pitch stabilizing assembly on each side of the vertical mid-plane, wherein each pitch stabilizing assembly comprises:
one anhedral upper pitch stabilizing means extending transversally in span from an upper inner airfoil to an upper outer airfoil; and extending longitudinally in chord from an upper leading edge to an upper trailing edge; a chord variation in span being, between an upper longest airfoil and the upper outer airfoil, a tapered variation, with the chord decreasing from the upper longest airfoil to the upper outer airfoil, one dihedral lower pitch stabilizing means extending transversally in span from a lower inner airfoil to a lower outer airfoil, and extending longitudinally in chord from a lower leading edge to a lower trailing edge; a chord variation in span being, between a lower longest airfoil and the lower outer airfoil, a tapered variation with the chord decreasing from the lower longest airfoil to the lower outer airfoil, one wing tip element extending in elevation between a corresponding upper outer airfoil and a corresponding lower outer airfoil, wherein, for each pitch stabilizing assembly:
the upper pitch stabilizing means are forwardly offset in a longitudinal direction from the lower pitch stabilizing means by a longitudinal distance of between 0.5 and 3 times a mean chord of the upper pitch stabilizing means, the upper pitch stabilizing means are upwardly offset in an elevation direction from the lower pitch stabilizing means by a vertical distance of between 0.5 and 3 times the mean chord of the upper pitch stabilizing means, the distance between the vertical mid-plane and a point of the pitch stabilizer furthest from the vertical mid-plane is comprised between 0.5 times and once a width of the fuselage, wherein each upper pitch stabilizing means comprise:
an upper inner structural frame,
an upper surface rigidly joined to the upper inner structural frame and located around said upper inner structural frame,
and upper connecting means in turn comprising:
an upper bracket in each upper pitch stabilizing means, rigidly mounted on the upper inner structural frame, and,
a rotational shaft, rigidly attached to the upper bracket and suitable for rotating around a top mount rigidly connected to the tailboom, and in that each lower pitch stabilizing means comprise:
a lower inner structural frame,
a lower surface rigidly joined to the lower inner structural frame and located around said upper inner structural frame,
and lower connecting means in turn comprising:
a lower bracket in each lower pitch stabilizing means, rigidly mounted on the lower inner structural frame, each lower bracket comprising a screw, and,
a lower mount comprising, at each side of the vertical mid-plane, at least two inserts, so that the screw of each lower bracket can alternatively be inserted in one of the at least two inserts of the corresponding side of the vertical mid-plane, thus allowing the rotation of the pitch stabilizer around the rotational shaft.

2. The rotorcraft according to claim 1, wherein the pitch stabilizer further comprises:
a first horizontal plane which passes through an intersection of the upper longest airfoil and the upper leading edge,
a first projection of a segment of the upper leading edge extending from the upper longest airfoil to the upper outer airfoil over the first horizontal plane,
a first vertical plane, perpendicular to the vertical mid-plane, which passes through the intersection of the upper longest airfoil and the upper leading edge,
wherein an upper leading acute angle $\alpha 1$, ranging between 2 degrees and 45 degrees, is formed between the first projection and the first vertical plane.

3. The rotorcraft according to claim 2, wherein the pitch stabilizer further comprises:
a second horizontal plane which passes through an intersection of the upper longest airfoil and the upper trailing edge,
a second projection of a segment of the upper trailing edge extending from the upper longest airfoil to the upper outer airfoil over the second horizontal plane,
a second vertical plane, perpendicular to the vertical mid-plane, which passes through the intersection of the upper longest airfoil and the upper trailing edge,
wherein an upper trailing acute angle $\alpha 3$, ranging between 2 degrees and 45 degrees, is formed between the second projection and the second vertical plane.

4. The rotorcraft according to claim 3, wherein the pitch stabilizer further comprises:
a third horizontal plane which passes through an intersection of the lower longest airfoil and the lower leading edge,
a third projection of the segment of the lower leading edge extending from the lower longest airfoil to the lower outer airfoil over the third horizontal plane,
a third vertical plane, perpendicular to the vertical mid-plane, which passes through the intersection of the lower longest airfoil and the lower leading edge,
wherein a lower leading acute angle $\alpha 2$, ranging between 2 degrees and 45 degrees, is formed between the third projection and the third vertical plane.

5. The rotorcraft according to claim 4, wherein the pitch stabilizer further comprises:
a fourth horizontal plane which passes through an intersection of the lower longest airfoil and the lower trailing edge,
a fourth projection of the segment of the lower trailing edge extending from the lower longest airfoil to the lower outer airfoil over the fourth horizontal plane,
a fourth vertical plane, perpendicular to the vertical mid-plane, which passes through the intersection of the lower longest airfoil and the lower trailing edge,
wherein a lower trailing acute angle $\alpha 4$, ranging between 2 degrees and 45 degrees, is formed between the fourth projection and the fourth vertical plane.

6. The rotorcraft according to claim 5, wherein the pitch stabilizer further comprises:
a fifth vertical plane, perpendicular to the vertical mid-plane, which passes through an intersection of an upper quarter chord line of the upper pitch stabilizing means and the upper inner airfoil,
a fifth projection of the upper quarter chord line of the upper pitch stabilizing means over the fifth vertical plane,
a fifth horizontal plane perpendicular to the vertical mid-plane, extending in a longitudinal direction and which passes through the intersection of the upper inner airfoil and the upper quarter chord line of the upper pitch stabilizing means,
wherein a superior acute angle $\beta 1$, ranging between 2 degrees and 45 degrees, is formed between the fifth projection and the fifth horizontal plane.

7. The rotorcraft according to claim 6, wherein the pitch stabilizer further comprises:

a sixth vertical plane, perpendicular to the vertical midplane, which passes through an intersection of the lower quarter chord line of the lower pitch stabilizing means and the lower inner airfoil, a sixth projection of the lower quarter chord line of the lower pitch stabilizing means over the sixth vertical plane, a sixth horizontal plane perpendicular to the vertical midplane, extending in a longitudinal direction and which passes through the intersection of the lower inner airfoil and the lower quarter chord line of the lower pitch stabilizing means, wherein an inferior acute angle $\beta 2$, ranging between 2 degrees and 45 degrees, is formed between the sixth projection and the sixth horizontal plane.

8. The rotorcraft according to claim 1, wherein each wing tip element comprises at least three sections, a first section, directly connected to an upper edge airfoil, whose quarter chord line is formed by one or more circular arcs; a second section, directly connected to the lower outer airfoil, whose quarter chord line is also formed by one or more circular arcs; and a third section whose quarter chord line is a straight line tangent to the quarter chord lines of the first and the second sections, said third section having a chord whose length is equal to or smaller than a predetermined reference chord of the one or two upper pitch stabilizing means.

9. The rotorcraft of claim 8, wherein the quarter chord line of the first section and the quarter chord line of the second section are each made by two circular arcs tangent to one another, the radii of said arcs being comprised between 0.01 and 4 times the predetermined reference chord of the one or two upper pitch stabilizing means.

10. The rotorcraft according to claim 1, wherein the upper longest airfoil is the upper inner airfoil and the lower longest airfoil is the lower inner airfoil.

11. The rotorcraft according to claim 1, wherein the top mount comprises active means suitable for remotely controlling the rotation of the rotational shaft.

* * * * *